United States Patent Office 3,393,739
Patented July 23, 1968

3,393,739
METHOD OF PERMEABLY CONSOLIDATING LOOSE SANDS
Milton Rosenberg, Cincinnati, Ohio, assignor to Gulf Research & Development Company, Pittsburgh, Pa., a corporation of Delaware
No Drawing. Filed July 9, 1965, Ser. No. 470,922
12 Claims. (Cl. 166—33)

ABSTRACT OF THE DISCLOSURE

Unconsolidated sands are permanently consolidated by impregnation with furfuryl alcohol or a prepolymer of furfuryl alcohol. The furfuryl alcohol is cured to form a resin bonding the particles together by passing a gaseous catalyst such as HCl in either the pure state or diluted with inert gas through the impregnated sands.

---

This invention relates to a method for consolidating loose sand formations, particularly incompetent sand formations surrounding a well bore.

Oil bearing sand formations frequently break down and produce sand in the well bore as a result of insufficient cohesion between adjacent sand particles under the conditions prevailing in the well. These formations may break down during the drilling or well completion operations or they may produce sand when the well is brought into production as a combined effect of the stresses created by the overburden and the flow velocity of the reservoir fluid. This represents a particular problem in sand formations in which there is inadequate natural cementing material to bind the sand grains together. Since the production of sand by the well fluid is very undesirable, many solutions to this problem have been proposed.

One method that has been used in incompetent formations is the placement of a slotted liner in the formation with gravel packing to hold back the sand particles. Another method involves the introduction of a substance into the incompetent formation adjacent to the well bore to supplement any naturally occurring cement and bind the sand particles together into a rigid but permeable formation. Somewhat severe requirements are placed upon this artificially introduced sand cementing material in order that the formation be adequately consolidated against the conditions which can reasonably be anticipated in well preparation or during oil production. This cementing material must both form a strong bond with the individual sand grains as well as have an adequate internal strength. In order to be effective it must be capable of penetrating the formation a critical distance from the well bore and must not substantially decrease the formation permeability. Also for general utility it is desirable that this material be temperature and moisture resistant and withstand ordinary methods of well stimulation including resistance to hot gases, hot water, steam and treating acids.

Those methods which have been used in dealing with incompetent formations have presented a number of disadvantages. When a slotted liner with gravel packing is used, it has been discovered that the sand particles or fines can migrate and plug up the conducting channels in the pack. Sodium silicate or water glass has been suggested as a cementing substance, but it has been found that formations consolidated with this material disintegrate in the presence of hot water. Slurries or suspensions of various cementing materials rather than true solutions have been tried, but these are not practical with any but the rarely encountered, coarse grain, high permeability formations because the suspended particles will filter off as a cake onto the surface of the formation without any effective penetration into the formation.

Various resin formations have been used with variable success, however, many problems have accompanied their use. For example, premixing the resin-former with a catalyst places a positive time factor in the operation. Delays or accidents have resulted in the resin polymerizing in the equipment or well bore itself prior to introduction into the formation or in the formation before permeability is regained. Moreover, in an effort to assure adequate retention of permeability in the treated formation, a flushing liquid is injected for partial displacement of the resin-forming solution or a liquid diluent is used in the formulation itself which is rejected as the resin shrinks onto the sand grains and sets. Both the adhesive characteristics and the strength of the final resin are adversely affected by these liquid diluents and flushing agents. Successful use of these methods requires great precision with inadequate consolidation or a substantial loss of formation permeability still a common result.

In accordance with my invention a resin-forming material is introduced into the formation prior to its contact with the catalyst. By this technique the criticality of time has been avoided. Unexpected delays or accidents can be accommodated without resulting resinification in the equipment or well bore. This permits much greater flexibility in conducting well operations and relieves the well workers of pressures which might otherwise lead to mistakes and accidents.

A further aspect of my invention is that a gaseous material is used to regain formation permeability after the resin-forming composition has been injected into the formation. This gas will drive excess resin-forming material deeper into the formation in a non-miscible displacement leaving only a coating on the sand grains, particularly at the intergranular contacts, and by this technique avoiding the piston-like displacement which would occur with a liquid flush. The curing of the resin-forming material with a gaseous catalyst is another aspect of my invention. This gas catalyst may be used alone or it may be accompanied with inert diluents and may also be the gas which is used to regain permeability in the formation, as previously discussed. For example, the catalyst gas may be injected into the formation previously saturated with the resin-forming liquid forcing the excess amount of resin precursor deeper into the formation away from the well bore and curing to a hard resinous bond that portion which remains coated on the sand grains. Under an alternative procedure the permeability of the formation is recovered by using an inert gas such as nitrogen or air, and this is followed immediately by the injection of the gaseous catalyst either alone or entrained in the inert gas.

In accordance with this process close control of the consolidation operation is possible. The passage of time accompanied by the threat of premature setting of the resin is no longer a critical factor. The resin precursor may be handled above ground or may be left in the formation following injection for a substantial length of time without hardening yet when setting is desired, it can be accomplished in a short period of time. No special purpose additives are needed in the resin-forming material, and therefore no reduction in cohesive properties of the resin and no interference with the wetting of or adhesion to the sand grains results from this cause. A strong intergranular bonding is thereby accomplished. The resulting formation is a strong durable product possessing up to 85 percent of its original unconsolidated permeability.

In accordance with my invention furfuryl alcohol or an acid-curable partial polymer formed by the homopolymerization of furfuryl alcohol or by the partial copolymerization of furfuryl alcohol with another composition is injected into the formation to be consolidated and this is subsequently fully cured with a gaseous catalyst to a strongly adherent polymer. Furfuryl alcohol is a very fluid substance having a viscosity of 4.6 centipoises at 25° C. It is volatile at ambient conditions with a boiling point of 170° C. and is infinitely soluble in water. Its physical properties can be adjusted by partial polymerization under controled conditions to produce a prepolymer having a viscosity of any desired value, for example, up to one thousand centipoises or more together with a lowered vapor pressure and water solubility.

A furfuryl alcohol prepolymer useful herein can be prepared by the controled self-condensation of furfuryl alcohol. For example, an amount of furfuryl alcohol can be heated at a reflux with ten percent by weight of a 4.25 percent phosphoric acid solution. Reflux is continued for several hours until the desired viscosity is reached. When using this more viscous prepolymer or other partial polymers, it is prefrred that up to about one percent of a surfactant such as isooctylamine be incorporated into the material in order to insure complete wetting of the formation particules and ejection of formation water and oil or ejection of a preflush liquid if such has been used. In addition, the viscosity and curing properties of the prepolymer can be adjusted by dilution with furfuryl alcohol which co-cures with the partial polymer or less preferably with up to about 70 percent of an organic solvent such as benzene or toluene, which is rejected as the curing resin deposits onto the sand grains.

Those liquid partial copolymerization products of furfuryl alcohol with other substances which are curable with an acid gas catalyst hereunder are included herein. Examples of this group are partial polymers of furfuryl alcohol with formaldehyde, with urea and formaldehyde, with phenol and formaldehyde and with one or more compounds containing two or more epoxy groups. Such mixed partial polymers are well-known in the art, a specific example being the stable, liquid partial polymer made from about 100 parts by weight of furfuryl alcohol, about 54 parts formaldehyde, and about three parts urea. In general, these partial copolymers will be made from at least ten percent furfuryl alcohol and preferably more than 25 percent furfuryl alcohol and will generally vary in viscosity from 100 to 10,000 centipoises. Formulations of this type or information regarding them are available from The Quaker Oats Company, an example being Furset 4090, a furfuryl alcohol-urea-formaldehyde reaction product having a viscosity of approximately 750 centipoises. The partial polymers of furfuryl alcohol and the partial copolymers may be mixed with each other and also with furfuryl alcohol for adjustment of viscosity and curing properties.

In consolidating sand formations hereunder the furfuryl alcohol or furfuryl alcohol-containing prepolymer is injected into the formation and this is followed by the injection of a gas which drives excess resin-former deeper into the formation sand leaving a coating on the sand grains particularly at the intergranular contacts. This gas may be a catalyst which cures the coating on the grains as the excess resin-former is driven ahead of it, or the gas may be inert and may be followed subsequently by the gas catalyst. Furfuryl alcohol in the formation sands may be cured by hydrogen chloride, gaseous acyl halides such as methyl chloride, gaseous Lewis acids such as boron trifluoride, boron trichloride, sulfur dioxide, hydrogen sulfide and other similar gaseous Lewis acids. These acid gases represent a range of catalytic strength. The nature of the gas catalyst and its concentration as well as the ambient temperature and pressure in the formation determine the curing rate of the resin.

The rate of cure may be controlled by catalyst selection and by its dilution using an inert gas such as nitrogen, air, hydrogen, carbon dioxide, combustion gases, natural gas and the like. The inert gas may first be injected alone into the formation for an initial period of time to regain permeability and then the catalyst gas entrained in the inert gas stream to initiate the curing cycle. Alternatively, the gas mixture may be injected from the beginning either at a constant concentration or with the concentration gradually increased over a period of time. The diluted catalyst gas stream should contain at least ten percent catalyst gas to provide a significant catalytic effect with at least 20 percent preferred. If one of the weaker catalytic gases is utilized, it may be injected alone without necessitating a source of inert gas. Since the curing rate varies directly with formation temperature and pressure, actual down-hole conditions should be taken into consideration in selecting catalyst type and concentration.

Another procedure for catalyst gas injection involves its generation in the well proximate to the perforations. For example, a suitable burner containing a solid rocket fuel which forms more than ten percent hydrogen chloride gas during combustion is lowered and is used both to drive the resin-former into the formation and to cure it. A specific example of this technique of catalyst gas generation involves the down-hole combustion of TP-J3000, a composite base solid propellant made by Thiokol Chemical Corporation, which produces 20.6 mol percent hydrogen chloride in the combustion gases.

Most formations to be treated contain a connate water and oil phase. It is preferred that the formation to be consolidated be freed of both the water and oil to insure superior consolidation. When the treating liquid is injected into the formation, it will displace the water in the formation driving it ahead into the formation away from the well bore. The same is true of a low viscosity oil. However, if the oil is viscous, special consideration must be given to the displacement of this viscous oil. It may be displaced by injecting a low viscosity oil prior to the injection of the treating fluid or it may be displaced by using a viscous furfuryl alcohol prepolymer containing a suitable surfactant to improve its wetting properties to displace the water and viscous crude from the formation pores. Since furfuryl alcohol monomer preferentially wets the sand grains in the presence of water or hydrocarbon liquids, it will effectively displace both connate water and low viscosity reservoir fluids without requiring a preflush. However, even in this instance a suitable preflush will result in a superior consolidation.

The use of furfuryl alcohol in consolidating sand in accordance with my invention is illustrated in the following experiments:

Experiment No. 1

One thousand forty-four grams of water-saturated Wausau quartz sand (34 percent retained on No. 30 sieve and 65 percent on No. 40 sieve) were packed into a piece of two-inch tubing that was 12 inches long. Approximately 750 milliliters of Quinduno crude were pumped through the said. This was followed by 500 milliliters of furfuryl alcohol. Hydrogen chloride gas was then passed through the sand-packed tubing. The tubing heated up, indicating that the exothermic polymerization reaction was taking place. The gas was passed through the tube for about three minutes and then the gas was shut off.

When cooled, the sand in the tubing was well consolidated and had a permeability of 10.8 Darcys. Upon cutting open the tubing, it was found that the sand at the inlet and outlet ends of the tubing was better consolidated than the sand in the center of the tube. The difference in the consolidation is believed to be the result of insufficient gas treatment.

Experiment No. 2

Twelve hundred sixteen grams of water-wet Wausau quartz sand were packed into a one-foot long tubing and flushed with Quinduno crude. Through this were then flushed 400 cc. furfuryl alcohol after which HCl gas was flowed through for four minutes at a pressure differential of between 30 and 60 pounds. An exothermic reaction took place within the tube and the tube was then allowed to cool to room temperature. When cooled, the core was cut into three sections, each four inches long. A visual examination of the ends of each section showed that the sand grains were well cemented together and had a porous structure.

A sample taken from one of the sections had a compressive strength of 1060 p.s.i. An open four-inch section was exposed to a temperature of 300° F. approximately 18 hours. An examination of the core surfaces showed no visible evidence of weakening or displacing of the cementing material from the surfaces of the sand. Another core was sealed with pipe caps and heated at 1000° F. for 24 hours. When examined at room temperature, the sand grains were still cemented together, although their mechanical stability was greatly reduced by this severe heat treatment. The permeability of a four-inch section of the tubing containing the consolidated core was 10.6 Darcys as determined with kerosene.

Experiment No. 3

This test shows that sand can be consolidated under pressure with furfuryl alcohol and hydrogen chloride gas. A piece of two-inch tubing 22 inches long was packed with water-wet Wausau quartz sand and then fluished with Quinduno crude. After this, furfuryl alcohol was flushed through it. Hydrochloric gas was then introduced into the tube under a pressure of 500 p.s.i., and within a few seconds the pressure in the tubing built up to more than 1000 p.s.i. This pressure was reduced to 400 pounds and held there for three minutes. The pressure was then released and the tube allowed to cool to room temperature after which the tubing was cut into three equal sections and examined for consolidation.

A visual examination of the sand showed the sand was well consolidated. The compressive strength of two samples removed from the tubing was 733 p.s.i. and 880 p.s.i. However, because of difficulties in making the compressive strength measurements, these values were considered to be on the low side. The permeability of the consolidated core using kerosene was 1.2 darcies.

In consolidations using these resin-forming materials average compressive strengths of greater than 500 p.s.i. are regularly achieved with compressive strengths over 2000 p.s.i. with acceptable permeabilities resulting under oytimum conditions. A final permeability of at least 60 up to about 85 percent of the original permeability is desired with the permeability retention in part being dependent upon the viscosity of the treating solution, the less viscous the resin-former the greater the permeability retention. In order to achieve the desired permeability retention it is desirable to reduce the fluid resin-former saturation by the gas flush to at least about 30 percent of the pore space by the flushing operation. If a liquid such as kerosene rather than an inert gas is flushed through the treated formation prior to curing with the catalyst gas, the resin-forming liquid will be overflushed from the formation resulting in a weakly consolidated sand.

Since the curing rate is dependent on the nature and strength of the catalyst gas and increases as the temperature or pressure of the formation increases, these variables are correlated in order to control the consolidation operation. It is preferred that the formation temperature be no greater than 250° F. and preferably no greater than 200° F. so that premature curing will not occur. If the formation temperature is higher than desired, a preflush using a suitable cooled liquid will both flush reservoir fluids from the zone to be treated and cool this zone to a preferred temperature.

Furfuryl alcohol monomer is more sensitive to formation conditions than the prepolymer mixture. An elevated temperature in the formation together with a low formation pressure may result in significant evaporation and loss of the monomer necessitating under these conditions the use of a suitable prepolymer formulation or precooling of the formation. The rate of polymerization may be controlled as indicated by proper selection of the catalyst gas or by reducing the catalytic effect of a strongly catalytic gas such as hydrogen chloride by dilution with an inert gas such as nitrogen or air. As used herein inert gas means substantially without chemical activity both with respect to the resin-forming and the resinified material.

This process is now illustrated in the consolidation of a ten-foot pay zone lying between the interval of 3000 feet to 3010 feet. The casing is perforated near the middle of the pay zone with a four-inch single point entry notch using a radial jet. The viscosity of the reservoir crude is ten centipoises at the formation temperature and pressure of 150° F. and 1750 p.s.i. respectively. After establishing gas permeability by pumping air into the formation, eight barrels of diesel oil containing about 0.1 weight percent isooctylamine are injected to flush the formation liquids from a zone approximately five feet from the notch and render the sand oil wet with the flushing solution. This was followed by the injection of four barrels of a partial polymer of furfuryl alcohol having a viscosity of 100 centipoises. Air is then injected into the formation to reestablish gas permeability and drive excess furfuryl alcohol prepolymer deeper into the formation. Hydrogen chloride is then entrained in the air stream to form a mixture containing twenty percent acid and injection of this acid-air mixture is continued for two hours at which time the furfuryl alcohol is fully polymerized and the formation is consolidated in a zone extending about five feet from the notch. The well is put on production and produces sand-free oil over an extended period of time indicated successful consolidation.

Sand consolidated by furfuryl alcohol and furfuryl alcohol based resin-formers as described herein retains a substantial portion of its original permeability and possesses a good compressive strength. The consolidated formation displays excellent resistance to hexane, benzene, water and reservoir fluids. Further, it retains these properties as long as formation temperatures do not appreciably exceed 600° F. and may be subjected to stimulation techniques such as steam injection without undergoing significant deterioration. This process is generally useful for the consolidation of underground loose granular formations.

It is to be understood that the above disclosure is by way of specific example and that numerous modifications and variations are available to those of ordinary skill in the art without departing from the true spirit and scope of my invention.

I claim:

1. A method of permeably consolidating loose sands to form a consolidated mass having a compressive strength of at least 500 p.s.i. which comprises the steps of displacing through said sands a resin-forming material selected from the group consisting of furfuryl alcohol, prepolymers made from at least ten percent furfuryl alcohol, and mixtures thereof; and thereafter displacing a gaseous acidic catalyst through said sands to polymerize said resin-forming material and consolidate said sands.

2. A method in accordance with claim 1 in which the gaseous catalyst is hydrogen chloride.

3. A method in accordance with claim 1 in which the gaseous catalyst is diluted with an inert gas to remove resin-forming liquid from the spaces between the sand particles.

4. A method in accordance with claim 2 in which the hydrogen chloride is diluted with an inert gas to remove resin-forming liquid from the spaces between the sand particles.

5. A method in accordance with claim 4 in which the resin-forming material is a liquid partial polymer of furfuryl alcohol.

6. A method in accordance with claim 1 in which the resin-forming material is the partial polymer of furfuryl alcohol with a member selected from the group consisting of formaldehyde, urea and formaldehyde, phenol and formaldehyde, and an epoxy compound containing at least two epoxy groups.

7. A method of permeably consolidating loose sands to form a consolidated mass having a compressive strength of at least 500 p.s.i which comprises the steps of displacing through said sands a resin-forming material selected from the group consisting of furfuryl alcohol, prepolymers made from at least ten percent furfuryl alcohol, and mixtures thereof; thereafter displacing an inert gas through said sands to displace a portion of said resin-forming material further into said sands and reestablishing the permeability of said treated sands and displacing a gaseous acidic catalyst through said sands to polymerize said resin-forming material and consolidate said sands.

8. A method of permeably consolidating oil-bearing loose sands to form a consolidated mass having a compressive strength of at least 500 p.s.i. comprising displacing through said sands a low-viscosity solvent miscible in oil to displace oil therefrom, thereafter displacing through said sands a resin-forming liquid selected from the group consisting of furfuryl alcohol, prepolymers made from at least ten percent furfuryl alcohol, and mixtures thereof, thereafter displacing an inert gas through said sands to remove resin-forming liquid from the spaces between sand particles, and displacing a gaseous acidic catalyst through said sands to polymerize the resin-forming liquid and consolidate the sands.

9. A method as set forth in claim 8 in which the solvent is diesel oil.

10. A method as set forth in claim 8 in which the solvent is at a lower temperature than the sands and cools the sands to a temperature below 200° F.

11. A method as set forth in claim 8 in which the solvent contains a surfactant to aid wetting of the formation particles by the resin-forming liquid.

12. A method of permeably consolidating an incompetent formation penetrated by a well to increase the compressive strength of formation to at least 500 p.s.i. comprising displacing a low-viscosity solvent for oil down the well and into the incompetent sands, thereafter displacing a resin-forming liquid selected from the group consisting of furfury alcohol, prepolymers made from at least ten percent furfuryl alcohol, and mixtures thereof down the well and into the formation, thereafter displacing an inert gas down the well and into the formation to remove resin-forming liquid from the spaces between the particles of the formation, and displacing down the well and through the formation a gaseous acidic catalyst to polymerize the resin-forming liquid and consolidate the formation.

References Cited
UNITED STATES PATENTS

| | | | |
|---|---|---|---|
| 2,378,817 | 6/1945 | Wrightsman et al. | 166—33 |
| 2,471,600 | 5/1949 | Adams et al. | 260—67 |
| 2,796,934 | 6/1957 | Vogel | 166—33 |
| 3,199,590 | 8/1965 | Young | 166—33 |
| 3,223,161 | 12/1965 | Burge | 166—33 |
| 2,476,015 | 7/1949 | Wrightsman | 166—33 |
| 2,965,514 | 12/1960 | Less et al. | |
| 3,008,205 | 11/1961 | Blaies. | |
| 3,107,403 | 10/1963 | Moore. | |

CHARLES E. O'CONNELL, *Primary Examiner.*

I. A. CALVERT, *Assistant Examiner.*